United States Patent
Bezaire et al.

(10) Patent No.: US 6,283,329 B1
(45) Date of Patent: Sep. 4, 2001

(54) APPARATUS FOR APPLYING A FOAMABLE RESIN

(75) Inventors: Leon J. Bezaire, Ray Township; Jerry LaVern Leonard, II, Royal Oak, both of MI (US)

(73) Assignee: Jesco Products Company, Inc., Sterling Heights, MI (US)

( * ) Notice: Subject to any disclaimer, the term of this patent is extended or adjusted under 35 U.S.C. 154(b) by 0 days.

(21) Appl. No.: 09/248,056

(22) Filed: Feb. 10, 1999

Related U.S. Application Data

(60) Provisional application No. 60/074,276, filed on Feb. 10, 1998.

(51) Int. Cl.⁷ ...................................................... B67D 5/60
(52) U.S. Cl. .................................. 222/145.2; 222/145.5; 222/146.5; 222/149; 222/504; 239/134; 239/117; 239/423; 239/433
(58) Field of Search ................................... 222/1, 54, 63, 222/145.7, 145.5, 146.5, 149, 504, 134, 145.2; 239/13, 61, 69, 75, 117, 116, 134, 433, 423, 413

(56) References Cited

U.S. PATENT DOCUMENTS

| Re. 29,665 | 6/1978 | Gusmer et al. . | |
|---|---|---|---|
| Re. 35,010 | 8/1995 | Price . | |
| 3,038,750 | 6/1962 | Nielsen . | |
| 3,366,337 | 1/1968 | Brooks et al. . | |
| 3,379,376 | 4/1968 | Williams et al. . | |
| 3,385,526 | 5/1968 | Furrer . | |
| 3,463,363 | 8/1969 | Zelna . | |
| 3,541,023 | 11/1970 | Cole, III . | |
| 3,561,680 | 2/1971 | Ott . | |
| 3,578,246 | 5/1971 | Davis, Sr. . | |
| 3,758,001 | * 9/1973 | Callan ................... | 222/146 |
| 3,786,990 | 1/1974 | Hagfors . | |
| 3,986,672 | 10/1976 | Smith et al. . | |
| 4,003,501 | * 1/1977 | Ramazzotti et al. ................ | 222/149 |
| 4,090,695 | * 5/1978 | Stone et al. ............................. | 222/63 |
| 4,133,483 | 1/1979 | Henderson . | |
| 4,199,303 | 4/1980 | Gusmer et al. . | |
| 4,204,612 | * 5/1980 | Schrader et al. ..................... | 222/54 |
| 4,204,977 | 5/1980 | Zwirlein . | |
| 4,377,256 | 3/1983 | Commette et al. . | |
| 4,386,716 | * 6/1983 | Buck .................................. | 222/134 |
| 4,427,153 | 1/1984 | Schaefer . | |
| 4,471,887 | * 9/1984 | Decker ................................ | 222/149 |

(List continued on next page.)

Primary Examiner—David A. Scherbel
Assistant Examiner—Christopher S. Kim
(74) Attorney, Agent, or Firm—Reising, Ethington, Barnes, Kisselle, Learman & McCulloch, P.C.

(57) ABSTRACT

An apparatus for applying a foamable fluid plastic material including reactant fluids that form a foam when heated and mixed. A reactant fluid dispenser supplies the reactant fluids to a heated applicator gun mixing chamber at a constant flow rate despite any differences in viscosity. A valve needle extends into the mixing chamber and exposes fluid inlet openings when retracted, permitting the reactant fluids to flow into the mixing chamber. When advanced, the needle closes off the fluid inlet openings and dispenses the mixed fluids. A heater prevents the gun from drawing heat energy from initial quantities of the pre-heated reactant fluids which would prevent initial quantities of the fluids from reacting properly. The valve needle is disposed in a sleeve that defines the mixing chamber and is disposed in a sleeve receptacle of the gun. The fluid inlet openings may be disposed through a portion of a wall of the sleeve that includes a flat exterior surface that is disposed against a corresponding flat surface of the sleeve receptacle, the mixing chamber fluid inlets opening through the flat sleeve receptacle surface. A seal may be disposed around each mixing chamber fluid inlet between the respective flat portions of the sleeve and the sleeve receptacle to seal those surfaces against the escape of reactant fluids.

6 Claims, 9 Drawing Sheets

U.S. PATENT DOCUMENTS

| | | |
|---|---|---|
| 4,523,696 | 6/1985 | Commette et al. . |
| 4,809,909 * | 3/1989 | Kukesh .................................. 239/61 |
| 4,926,886 | 5/1990 | Lorenzen et al. . |
| 5,050,776 * | 9/1991 | Rosenplanter .................... 222/146.5 |
| 5,090,814 * | 2/1992 | Petcen ............................. 222/145.5 |
| 5,271,521 * | 12/1993 | Noss et al. ............................... 222/1 |
| 5,299,740 | 4/1994 | Bert . |
| 5,303,865 | 4/1994 | Bert . |
| 5,339,991 | 8/1994 | Snyder . |
| 5,348,230 | 9/1994 | Mullen et al. . |
| 5,375,634 | 12/1994 | Egger . |
| 5,388,761 * | 2/1995 | Langeman .............................. 239/61 |
| 6,102,304 * | 8/2000 | Gonitzke et al. .................... 239/433 |

* cited by examiner

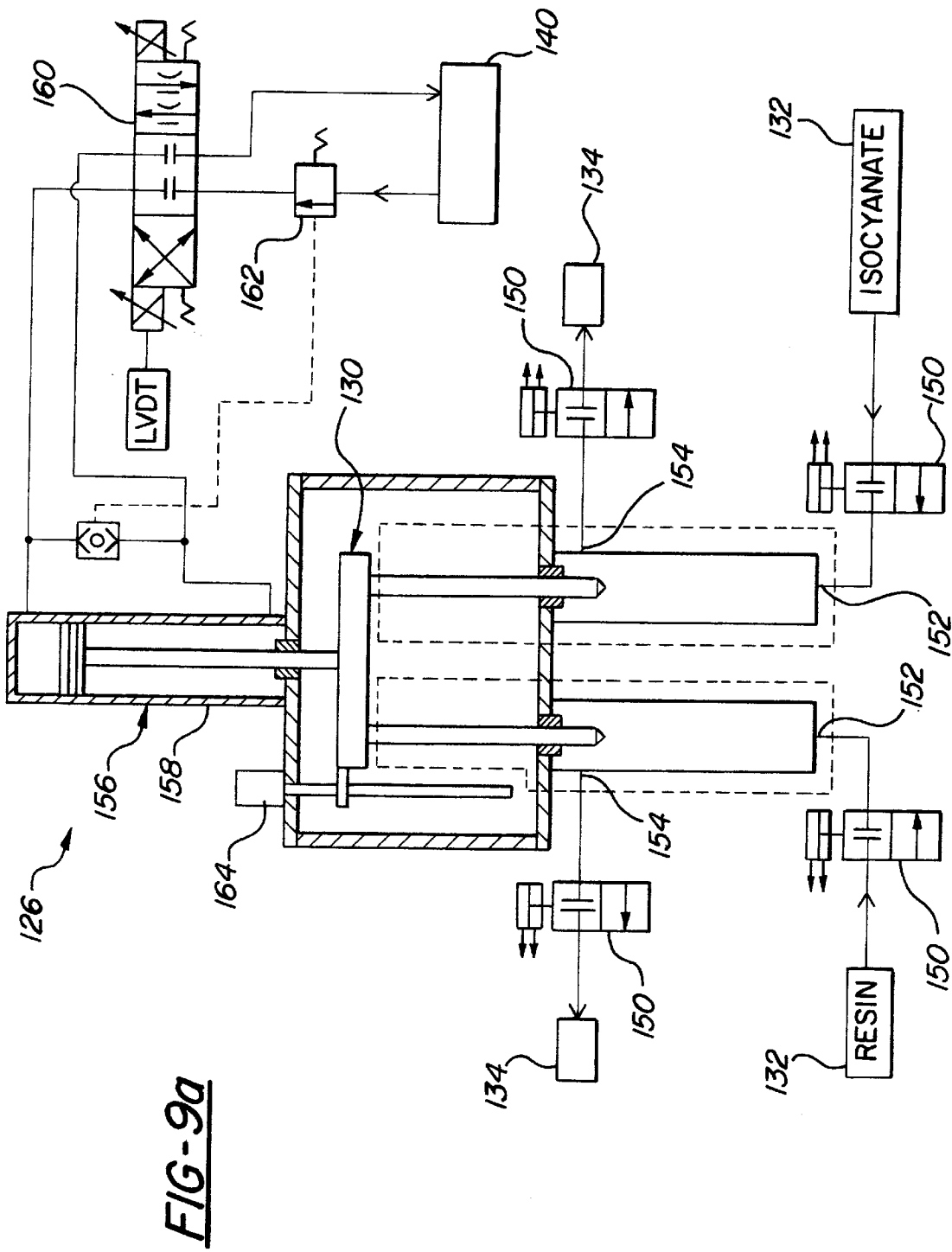

APPARATUS FOR APPLYING A FOAMABLE RESIN

This application is based on provisional application Ser. No. 60/074,276 filed Feb. 10, 1998.

FIELD OF THE INVENTION

The present invention relates to an apparatus for dispensing and applying a multi-component foamable fluid plastic material, including polyurethane foams.

DESCRIPTION OF THE PRIOR ART

Foam application apparatus are commercially available that apply multi-component foamable fluid plastic materials, preferably polyurethanes. The standard reactant fluids comprise a plastic material fluid component and an isocyanate fluid component bearing comparable viscosities and used in comparable ratios.

Typically, foam application apparatus include a cylindrical mixing chamber having separate orifi or fluid inlet openings for each reactant component and an axial passage transverse to the direction of the inlet passages for allowing the mixed or reacted fluid to exit the mixing chamber. The mixing chamber is typically mounted in a support body structure. The dimensional tolerance between the mixing chamber and valve body is made sufficiently close so that the reactant fluids cannot flow therebetween. Standard reactant fluids are sufficiently viscous to not normally flow between the mixing chamber and valve body.

A cylindrical rod or valve needle having an external diameter nearly the same as the internal diameter of the cylindrical mixing chamber moves forwardly and rearwardly in the mixing chamber. In the forward position, the valve needles close off the fluid inlet openings to prevent any fluid from entering the mixing chamber. In the rearward position, the valve needle is retracted under hydraulic pressure to expose the inlet openings to permit their respective fluids to flow in the mixing chamber and impingement mix therein. When enough reacted fluid has been dispensed, the valve needle moves to its forward position to once again close the inlet passages and prevent reactant fluid flow into and mixing in the mixing chamber.

Many apparatus of this type are well known in the art, including U.S. Pat. No. 4,377,256 to Commette, et al., and U.S. Pat. No. 5,339,991 to Synder. One common problem that is disclosed in U.S Pat. No. 5,339,991 is that conventional foam applications commonly seize up after a few thousand shots requiring cleaning of the valve components and mixing chamber before reuse.

Another problem associated with the prior art apparatus is that the foam application gun is not heated. This requires that the combination of heat energy dissipated from the heated reactant fluids and the heat given off by the reaction of the reactant fluids in the mixing chamber are used to heat the gun. One drawback with this is that the first several shots exiting the dispensing apparatus are wasted because the apparatus is not at a suitable temperature for carrying out the foaming reaction. Thus, heat is removed from the reactant fluids and the initial reacted fluids exiting the mixing chamber are not at a sufficiently high temperature for proper reaction.

Another problem has recently developed with respect to foam application guns. Recently developed chemistry using non-standard reactant fluids may also be used to make the plastic foam. These new reactant fluids use no or low isocyanates as one reactant fluid and a resin component as another reactant fluid. Some of these non-standard reactant fluids are not as viscous as the standard reactant fluids and may tend to seep between the mixing chamber and valve body. Furthermore, the ratios of reactant fluids in this type of system are not necessarily comparable.

SUMMARY OF THE INVENTION AND ADVANTAGES

According to the invention, an apparatus is provided for applying a multi-component foamable fluid plastic material, the material including at least two reactant fluids configured to form a foam when heated and mixed. The apparatus includes a heater disposed on and configured to heat a support body structure of an applicator gun. The apparatus also includes a mixing chamber supported in the support body structure and configured to receive pre-heated reactant fluids for mixing through two mixing chamber fluid inlet openings. The mixing chamber comprises an axial passage disposed generally transverse to the fluid inlet openings and configured to allow reactant fluids to exit the mixing chamber through an axial outer end of the axial passage. Two mixing chamber fluid inlets are disposed in the support body structure in fluid communication with the mixing chamber and are configured to direct the respective reactant fluids into the mixing chamber through the respective mixing chamber fluid inlet openings. An elongated valve needle is supported in the mixing chamber for reciprocal longitudinal movement between forward closed and a rearward open positions in the mixing chamber. The valve needle is configured to expose the fluid inlet openings when retracted to the rearward open position to permit the reactant fluids to flow into the mixing chamber from the respective inlet openings and impingement mix therein. The needle is configured to close off the fluid inlet openings and dispense the mixed fluids from the mixing chamber through the axial passage while being advanced to the forward closed position. The heater prevents the support body structure from drawing heat energy from initial quantities of the pre-heated reactant fluids, which would cool the initial quantities of the fluids, preventing them from reacting properly in the mixing chamber.

According to another aspect of the invention, the heater includes two heating elements; each element being disposed adjacent one of the mixing chamber fluid inlets. This allows the temperature of portions of the support body structure adjacent the mixing chamber fluid inlets to be controlled separately.

According to another aspect of the invention, the apparatus includes a gun temperature feedback control system including a temperature sensor configured to monitor support body structure temperature and a controller configured to control heater temperature based on temperature sensor inputs. The control system may be configured to control the temperatures of the two heating elements separately.

According to another aspect of the invention, the valve needle includes a helical groove configured to purge the mixing chamber of unreacted and reacted fluids by scraping the interior surface of the mixing chamber.

According to another aspect of the invention, the valve needle includes a pair of annular grooves disposed such that one of the annular grooves is positioned forward of the mixing chamber fluid inlet openings when the valve needle is in the closed position and the second of the annular grooves is positioned rearward of the mixing chamber fluid inlet openings when the valve needle is in the closed position. The annular grooves are configured to prevent reactant fluids from passing the annular grooves by allowing any residual reactant fluid to collect in the annular grooves and react thus creating a seal between the valve needle and an interior wall of the mixing chamber.

According to another aspect of the invention, the mixing chamber is defined by a sleeve supported in a sleeve receptacle in the support body structure. The fluid inlet openings are disposed in a wall of the sleeve. The mixing chamber fluid inlets open through respective flat portions of an interior surface of the sleeve receptacle. The fluid inlet openings are disposed in a flat portions of an exterior surface of the sleeve wall. The flat portions are disposed parallel to the respective flat portions of the interior surface of the sleeve receptacle. A seal is disposed around each mixing chamber fluid inlet and between the respective flat portions of the interior surface of the sleeve receptacle and the exterior surface of the sleeve wall to seal the interior surface of the sleeve receptacle to the exterior surface of the sleeve wall so that reactant fluids cannot escape the mixing chamber fluid inlet between those two surfaces.

According to another aspect of the invention, the apparatus comprises a mix head supported at an axial outer end of the support body structure. The sleeve receptacle is disposed in the mix head.

According to another aspect of the invention, a portion of one or each mixing chamber fluid inlet may be slightly angled to allow the reactant fluid injected from that inlet to disperse more evenly over the reactant fluid stream entering from the other mixing chamber fluid inlet.

According to another aspect of the invention, the wall of the sleeve has a generally rectangular cross-sectional shape along a portion of its length where the sleeve engages the mix head in the sleeve receptacle. The interior surface of the sleeve receptacle is rectangular in cross section and is configured to mate in close proximity with the wall of the sleeve. The seal recesses are disposed in respective generally opposing flat sidewalls of the sleeve receptacle and surround the respective mixing chamber fluid inlets.

According to another aspect of the invention, a forward seal is disposed between the sleeve and sleeve receptacle forward of the fluid inlet openings and a rearward seal is disposed between the sleeve and sleeve receptacle rearward of the fluid inlet openings.

According to another aspect of the invention, the apparatus includes a reactant fluid dispenser connected to the applicator gun and configured to supply at least one of the reactant fluids to the applicator gun mixing chamber through at least one of the mixing chamber fluid inlets at a constant flow rate. This continuously provides the first reactant fluid in proper proportion to a second one of the reactant fluids despite any differences between the two fluids such as viscosity and/or density.

According to another aspect of the invention, the reactant fluid dispenser is configured to supply the first and second reactant fluids to the applicator gun mixing chamber through the respective mixing chamber fluid inlets at constant respective flow rates.

According to another aspect of the invention, the reactant fluid dispenser includes a first reactant fluid source configured to dispense the first reactant fluid and a second reactant fluid source configured to dispense the second reactant fluid. A first metering unit is connected between and in fluid communication with the first reactant fluid source and the applicator gun and configured to move the first reactant fluid at a constant predetermined flow rate. A second metering unit is connected between and in fluid communication with the second reactant fluid source and the applicator gun and is configured to move the second reactant fluid at a constant predetermined flow rate. A driver is drivingly connected to the metering units and configured to drive the metering units at a constant speed.

According to another aspect of the invention, the reactant fluid dispenser is configured to maintain a constant ratio between the flow rates of the reactant fluids.

According to another aspect of the invention, the metering units of the reactant fluid dispenser are configured to move their respective reactant fluids using positive piston displacement. The ratio between the flow rates of the reactant fluids is changeable by replacing a piston of at least one of the metering units with a piston of different size.

According to another aspect of the invention, the driver includes a hydraulic cylinder connected to the metering units and a pressure compensated flow control valve connected to the hydraulic cylinder and configured to control driver speed.

According to another aspect of the invention, the reactant fluid dispenser includes first and second reactant fluid sources configured to dispense the first and second reactant fluids. A first metering unit is connected between and is in fluid communication with the first reactant fluid source and the applicator gun. A second metering unit is connected between and is in fluid communication with the second reactant fluid source and the applicator gun. A driver is connected to the first and second metering units and is configured to move the reactant fluids at constant respective flow rates. The driver is adjustable to alter the ratio between the respective flow rates of the reactant fluids.

According to another aspect of the invention, the driver includes two hydraulic cylinders, each cylinder being drivingly connected to one of the metering units. The driver includes two proportional directional flow control valves, each valve connected to and configured to control the movement of one of the hydraulic cylinders.

According to another aspect of the invention, the reactant fluid dispenser includes fluid pre-heaters disposed upstream from the respective metering units and configured to heat the respective reactant f luids before they enter the metering units.

According to another aspect of the invention, the reactant fluid dispenser includes two fluid post-heaters, each post-heater disposed downstream from one of the metering units. The dispenser also includes two heat sensors, each one of which is disposed in one of the reactant fluids and configured to monitor reactant fluid temperature. A controller is connected to the post-heaters and the heat sensors and is configured to control reactant fluid temperatures by adjusting heat output of the respective post-heaters in accordance with fluid temperature information fed back to the controller from the respective heat sensors.

According to another aspect of the invention, the controller includes a programmable logic controller configured to monitor and send signals to adjust the temperature, pressure, volume and flow rate of the reactant fluids.

According to another aspect of the invention, the cross-sectional areas of the mixing chamber fluid inlet openings are different. This allows the gun applicator to mix reactant fluids in proper proportions despite differences in viscosity. A forward edge of each fluid inlet opening is aligned in the direction of a longitudinal axis of the mixing chamber to expose each fluid inlet opening at the same time for proper reaction of the components.

According to another aspect of the invention, a method is provided for applying the multi-component foamable fluid plastic material. According to the method a heater is provided adjacent the support body structure. The support body structure is then heated by energizing the heater and a flow of the reactant fluids is provided through the mixing chamber fluid inlets and into the mixing chamber. Once mixed, the reactant fluids are dispensed from the mixing chamber.

According to another aspect of the inventive method, the support body structure is heated to a temperature generally equal to that of an optimum temperature for reaction of the reactive fluids.

According to another aspect of the inventive method, at least one heating element is provided in the support body structure adjacent the mixing chamber fluid inlets. The heating element is energized to transfer heat energy into the support body structure.

According to another aspect of the inventive method, a gun temperature control system is provided that includes a temperature sensor configured to monitor support body structure temperature. Heater temperature is controlled based on temperature sensor inputs received from the temperature sensor.

According to another aspect of the inventive method, a gun temperature control system is provided that includes two temperature sensors configured to monitor body structure temperature at respective locations adjacent the respective mixing chamber fluid inlets. Two heating elements are provided on the support body structure, each heating element disposed adjacent one of the mixing chamber fluid inlets. The temperatures of the two heating elements can then be controlled separately based on temperature sensor inputs received from the respective temperature sensors.

According to another aspect of the invention, an additional method is provided for applying the multi-component foamable fluid plastic material in which a second one of two reactant fluids has a relatively low viscosity. According to this method an applicator gun is provided that includes a first fluid inlet opening disposed in a flat portion of a wall of the sleeve that is disposed parallel to the flat portion of the interior surface of the sleeve receptacle, and a seal that is disposed around the first fluid inlet opening between the flat portions of the sleeve and the sleeve receptacle.

According to another aspect of the inventive method, an applicator gun apparatus is provided that includes a second fluid inlet opening disposed in a second flat portion of the interior surface of the sleeve receptacle generally opposite the first fluid inlet opening, and in which a second flat portion of the sleeve wall is disposed parallel to and adjacent the second flat portion of the interior surface of the sleeve receptacle. A second seal is disposed around the second mixing chamber fluid inlet between the second flat portions of the sleeve receptacle and of the sleeve. A flow of the second reactant fluid of relatively low viscosity is then provided into the mixing chamber through the second fluid inlet opening.

According to another aspect of the invention, a method is provided for applying a multi-component foamable fluid plastic material that includes providing a reactant fluid dispenser configured to supply the reactant fluids to an applicator gun mixing chamber through mixing chamber fluid inlets at respective constant flow rates. The reactant fluid dispenser is connected to the applicator gun, the reactant fluids are provided in the reactant fluid dispenser, the ratio between fluid flow rates is adjusted to supply the reactant fluids to the applicator gun mixing chamber at predetermined constant respective optimum flow rates for proper mixing, the reactant fluid dispenser is actuated to supply the reactant fluids to the applicator gun mixing chamber, and the applicator gun is actuated to dispense the resulting plastic material foam from the mixing chamber.

According to another aspect of the inventive method, the step of providing a reactant fluid dispenser includes providing a driver drivingly connected to first and second metering units and configured to move the respective first and second reactant fluids at constant predetermined flow rates, the metering units being configured to move their respective reactant fluids using positive piston displacement. The fluid flow ratio is adjusted by changing the flow rate of one the reactant fluids by replacing a piston of one of the metering units with a piston of different size.

According to another aspect of the inventive method, a driver is provided that includes a hydraulic cylinder drivingly connected to the metering units and a pressure compensated flow control valve connected to the hydraulic cylinder and configured to control driver speed. The fluid flow ratio adjusted by adjusting the flow rates of the reactant fluids by adjusting the flow control valve.

According to another aspect of the inventive method, a reactant fluid dispenser is provided that includes a driver connected to first and second metering units and configured to move the reactant fluids at constant respective flow rates, the driver being adjustable to alter the ratio between the respective flow rates of the reactant fluids. The flow rates of the first and second reactant fluids are adjusted by adjusting the driver.

BRIEF DESCRIPTION OF THE DRAWINGS

FIG. 9a is a schematic view of the reactant fluid delivery system of the present invention;

DESCRIPTION OF THE PREFERRED EMBODIMENTS

Figure 1:
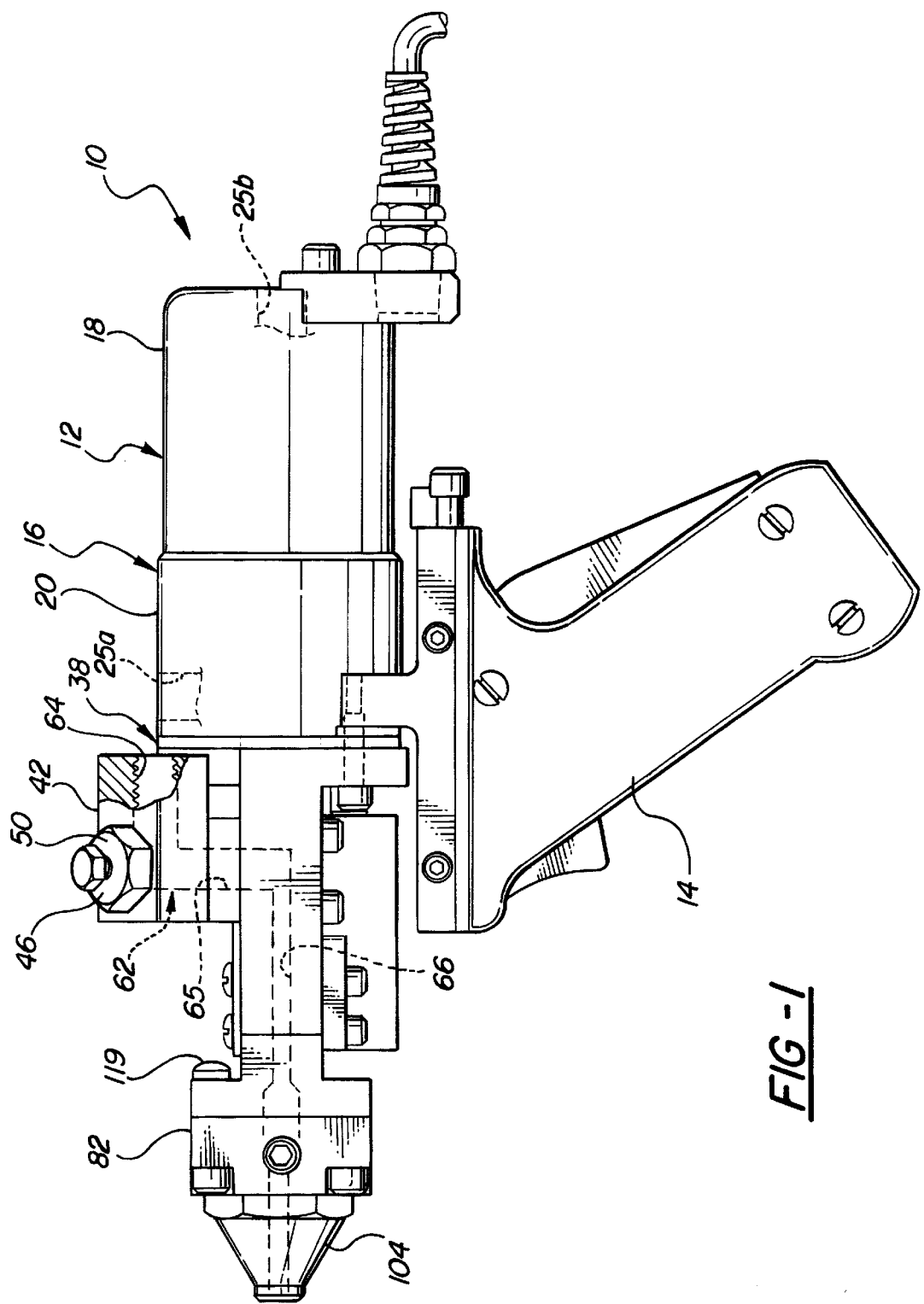
FIG. 1 is an elevational side view of the preferred embodiment of the present invention, showing the optional trigger handle.

An apparatus for dispensing and applying a multi-component foamable fluid plastic material is generally shown at 10 in the Figures. The embodiment shown in FIG. 1 shows an applicator gun generally indicated at 12. The applicator gun 12 may include an optional trigger handle 14. Opening and closing of the gun is controlled by an electronic controller in a manner described below. The electronic controller is shown in the form of a control panel at 128 in FIG. 9. The optional trigger handle 14 is used as an alternate means to send an electronic signal to the electronic controller 128 which, in turn, sends a signal to selectively operate a hydraulic cylinder assembly, generally indicated at 16 and thereby open and close the gun 12. It will be appreciated, however, that use of the optional trigger handle assembly 14 is not necessary to the operate of the gun.

The controller 128 controls all aspects and functions of every part of the dispenser system and gun 12. The system can be used in one of two ways: "manual" mode or "automatic" mode. When manual mode is utilized, the dispenser system and gun will respond to manual inputs to dispense foam, i.e., via a signal from the optional trigger handle 14 or the pressing of a dispense button on a touch screen of the electronic controller 128. When in manual mode, robot or automation signals generated by the controller 128 are disregarded.

When the automatic mode is selected, the metering system and gun will respond only to the signals sent via the electronic controller 128 to dispense foam, i.e., via a discrete signal from a robot controller or some other automation control or a signal sent over a network such as a remote I/O or "data highway plus" or RS232. When in automatic mode, manual inputs are disregarded. Therefore, the optional trigger handle 14 is a means for a user to send a dispense signal to the dispenser controller within the electronic controller 128 when the system is used in manual mode.

The trigger handle 14 can be likened to a dispense signal that a robot controller would send to a dispense control in the electronic controller 128 when the system is used in automatic mode. Thus, the dispenser control within the electronic controller 128 controls the applicator gun 12. The trigger handle 14 or robotic controller can request that a preprogrammed/preselected shot be dispensed from the gun 12 by sending a signal to the controller 128, but nothing happens unless and until the electronic controller 128 causes it to happen.

It is to be appreciated that the gun 12 is always opened and closed by a signal sent by the electronic controller 128. The trigger handle 14 merely provides an alternate means to send a dispense signal to the electronic controller 128 which responds by controlling the opening and closing of the gun 12. When the trigger handle 14 is not used, the opening and closing of the gun 12 is robotically controlled by the electronic controller 128.

Figure 5:
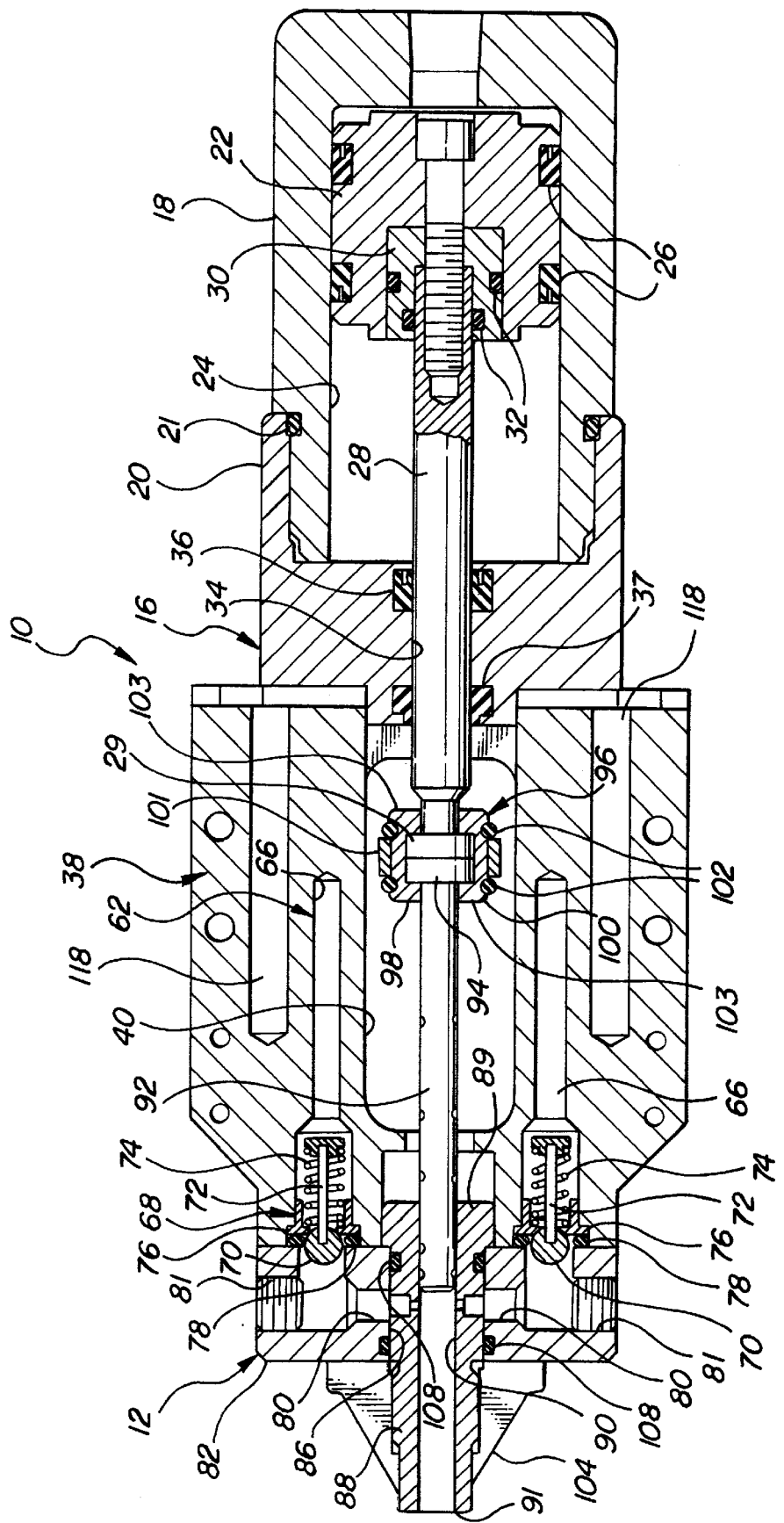
FIG. 5 is a cross sectional view taken along lines 5—5 of FIG. 2 showing a valve needle of the invention in a rearward open position.

As best seen in FIG. 5, the hydraulic cylinder assembly 16 includes a hydraulic cylinder body 18 connected to a hydraulic cylinder head 20 in any suitable manner. An appropriate seal, such as an O-ring seal 21 is disposed between the hydraulic cylinder body 18 and hydraulic cylinder head 20. A hydraulic piston 22 reciprocates within a bore 24 in the hydraulic cylinder body 18. A pair of hydraulic lines is in fluid communication with the bore 24. The hydraulic lines enter through openings 25a, 25b (FIG. 1) in the hydraulic cylinder assembly 16. One of the hydraulic line openings 25a is positioned such that it allows hydraulic fluid to flow into and out of the bore 24 forward of the piston 22. The second hydraulic line opening 25b is positioned such that it allows hydraulic fluid to flow into and out of the bore 24 rearward of the piston 22. In this manner, hydraulic actuation of the piston 22 is controlled in a normal manner, well known in the art. A plurality of suitable seals 26, such as O-ring energized lip seals are disposed about the piston 22 to prevent the flow of hydraulic fluid around the piston 22 within the bore 24. A solenoid directional valve is used to control the hydraulic cylinder assembly 16 to open and close the gun 12.

A connecting rod 28 is secured to the piston 22 in any suitable manner. In the preferred embodiment, the connecting rod 28 is fixed to a piston washer 30 that is retained in the piston 22. The piston washer 30 moves with the piston 22, thereby moving the connecting rod 28. Suitable seals 32, such as O-ring seals are disposed between both the piston washer 30 and piston 20 and between the piston washer 30 and connecting rod 28. The hydraulic cylinder head 20 includes a bore 34 for receiving the connecting rod 28. Further, a hydraulic seal 36 is disposed about the connecting rod 28 and retained within the hydraulic cylinder head 20. The hydraulic seal 36 prevents the flow of hydraulic fluid about the connecting rod 28 and into the bore 34 in the hydraulic cylinder head 20. A rod wiper 37 is also disposed about the connecting rod 28 in the hydraulic cylinder head 20 to wipe debris from the connecting rod 28.

The hydraulic cylinder assembly 16 is connected to a support body structure in the form of a gun body, generally indicated at 38 in FIGS. 1–6. The gun body 38 includes a longitudinally extending bore, shown at 40 in FIG. 5, for receiving the connecting rod 28 (and valve needle as described below).

Figure 2:
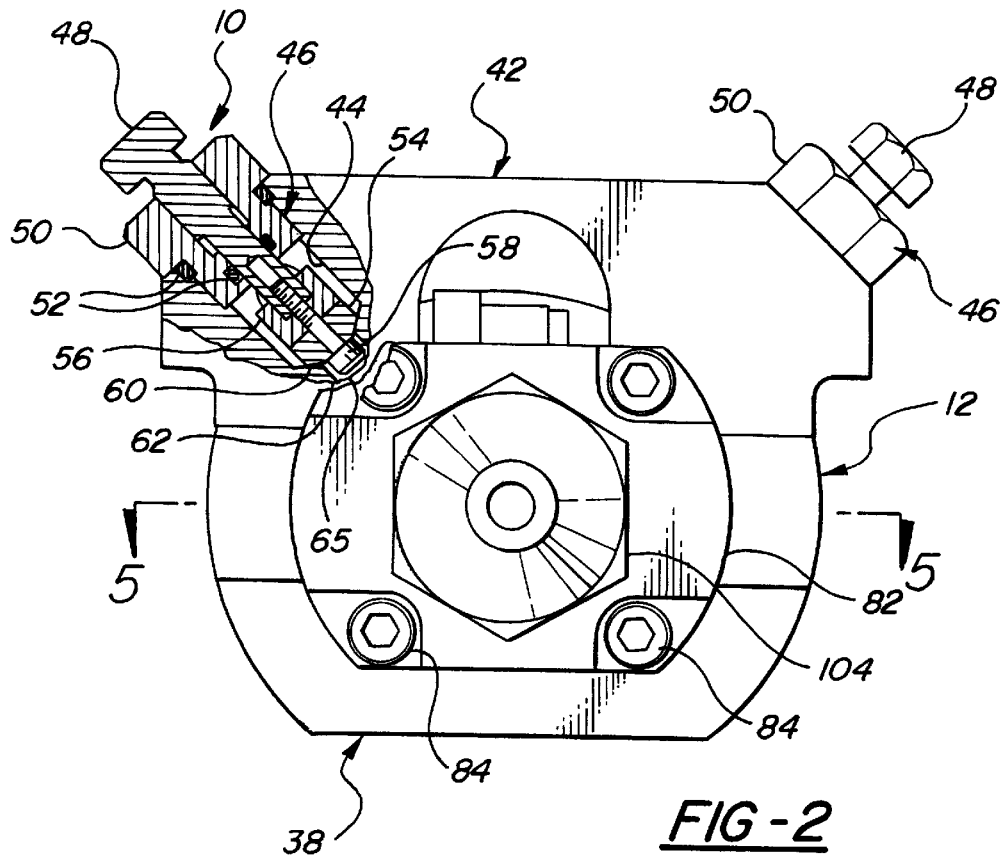
FIG. 2 is a front end view of the preferred embodiment, without the optional trigger handle, partially in cross section.
Figure 3:
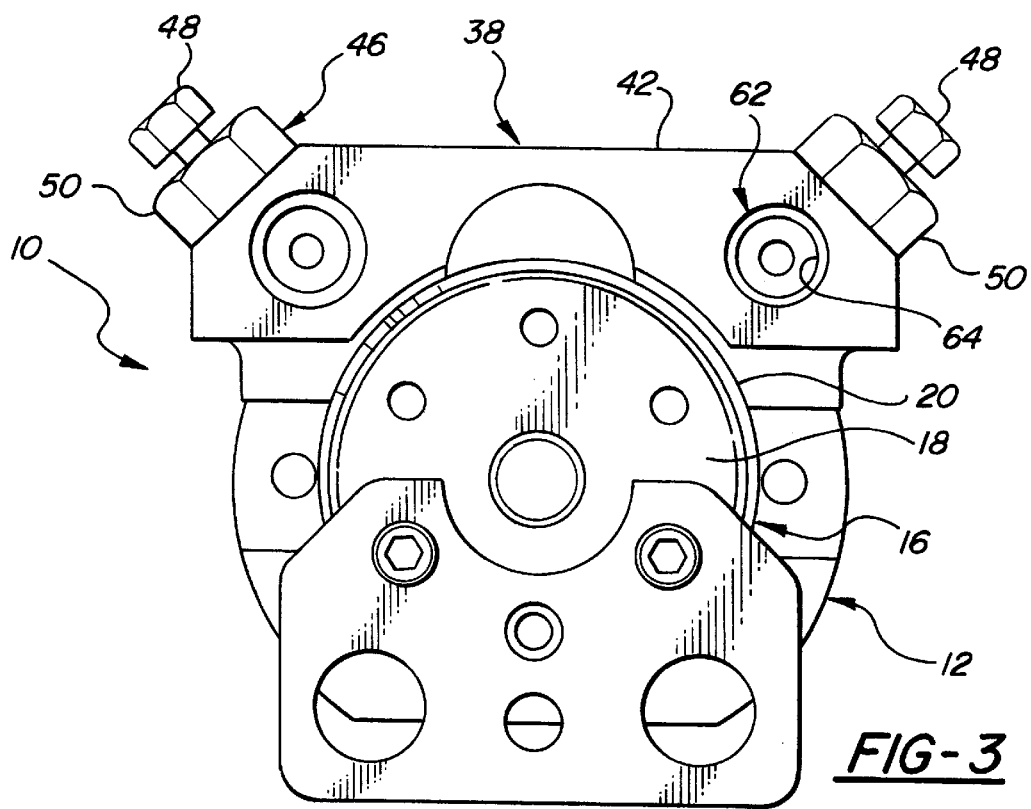
FIG. 3 is a rear end view of the preferred embodiment, without the optional trigger handle.
Figure 4:
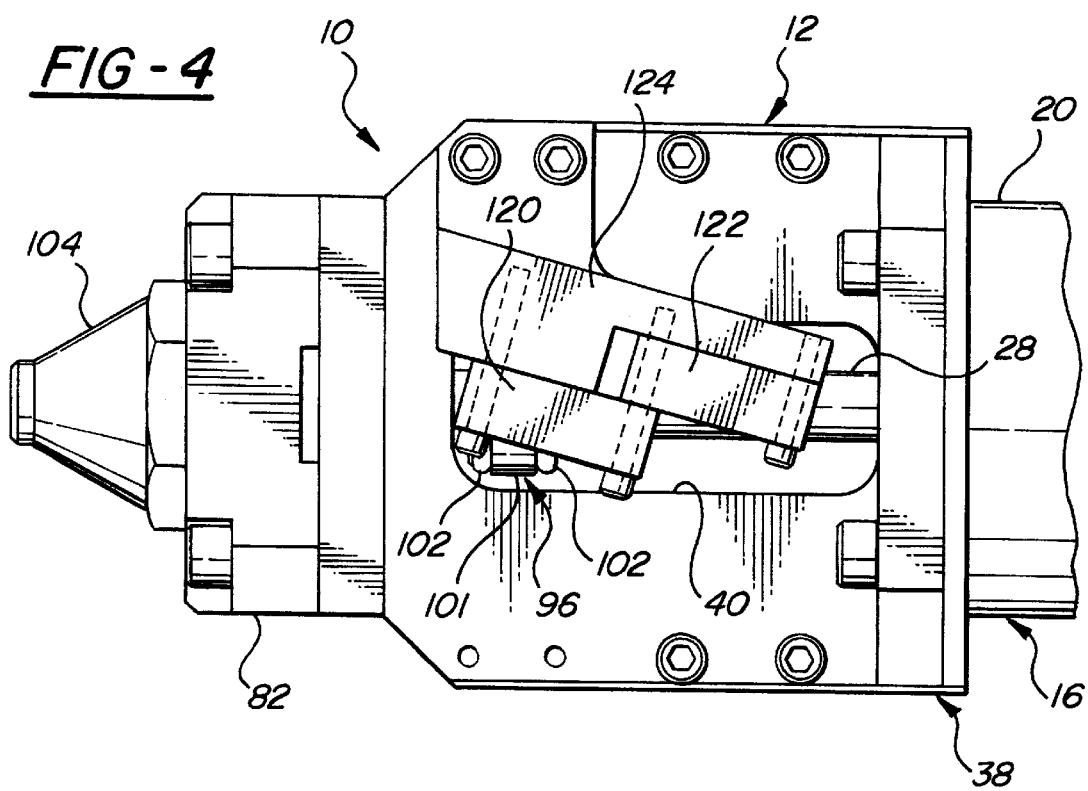
FIG. 4 is a bottom view of the preferred embodiment of the present invention, partially broken away.

The gun body 38 includes a fluid inlet manifold shown at 42 in FIGS. 1–4. The fluid inlet manifold 42 is mounted on the gun body 38 to allow the respective components of the foamable plastic material to flow into the gun body 38 (as best seen in FIGS. 2 & 3). The fluid inlet manifold 42 includes at least a pair of openings 44. Each opening 44 is adapted to receive a valve assembly generally indicated at 46 in FIGS. 1–3. The valve assembly 46 includes a valve stem 48 that is maintained within the opening 44 by a retainer 50. The retainer 50 is secured within the opening 44 in any suitable manner. The valve stem 48 is preferably threadedly retained within the retainer 50. Suitable seals 52, preferably O-ring seals, are disposed between the retainer 50 and the gun body 38, and between the valve stem 48 and retainer 50 to prevent the flow of fluid therepast.

As is best shown in FIG. 2, the valve assembly 46 further includes a valve 54 and a valve washer 56. A screw 58 is disposed within the valve 54 and valve washer 56. The screw 58 is threadedly received within a bore in the valve stem 48. The screw 58 connects the valve 54 and valve washer 56 with the valve stem 48. The valve 54 has a tapered end 60 that seats against the fluid inlet manifold 42 when the valve assembly 46 is in the closed position to prevent reactant fluid flow into the gun. When the valve assembly 46 is in the normally open position, the tapered end 60 is unseated from the gun body and allows reactant fluid to flow therepast. The valve assembly 46 is moved between the closed and normally open positions by turning the valve stem 48. Rotation of the valve stem 48 causes respective movement of the valve 46. By allowing for manual shut off of the reactant fluid flow at the valve assembly 46, the flow of reactant fluid into the gun body can be manually controlled to allow servicing of the gun 12 or the like.

Figure 6:
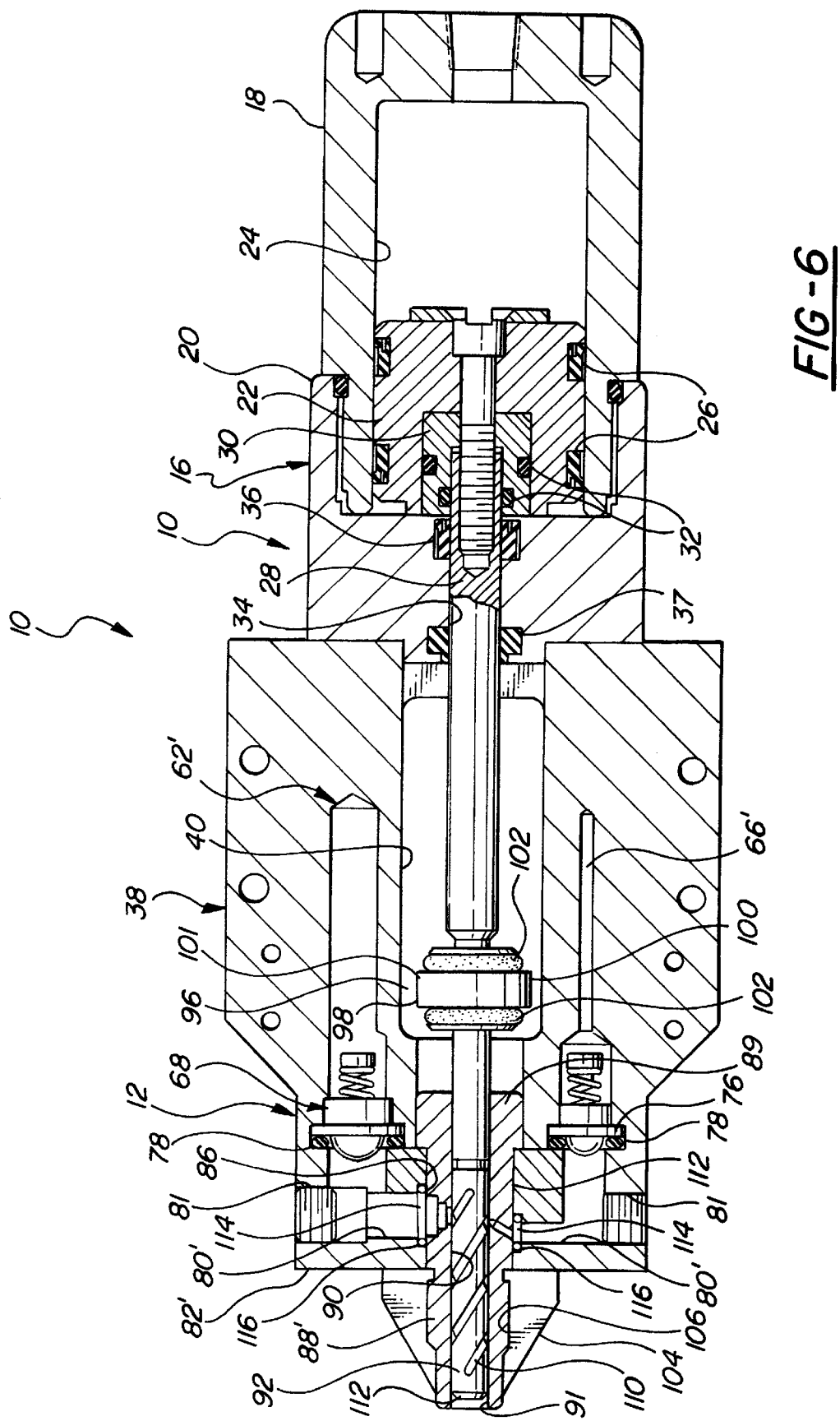
FIG. 6 is a cross sectional view similar to FIG. 5 showing an alternate embodiment showing the valve needle in a forward closed position.

The gun body 38 includes a fluid inlet or fluid inlet passage, generally indicated at 62 in FIGS. 1–3 and 5 and at 62' in FIG. 6 (a prime designation is used to denote similar components having modified structures among the embodiments), connected to each of the openings 44. While the inlet passage 62, 62' may take any suitable configuration, in the preferred embodiment, each fluid inlet passage 62, 62' comprises three passage components 64'; 65, 65' and 66, 66'. An inlet passage component 64' is disposed in the fluid inlet manifold 42. The reactant fluid hose attaches to the fluid inlet manifold 42 at the rear thereof, where the inlet passage component 64, commences (FIG. 3). The inlet passage component 64' terminates in the opening 44. A transverse passage component 65, 65' is disposed within the fluid inlet manifold 42 and is oriented transverse to the longitudinal direction of the gun body 38 and traverse to the inlet passage component 64'. This transverse passage component 65, 65' is in fluid communication with the opening 44. The tapered end 60 of the valve 54 is oriented at the top of the transverse passage component 65, 65' and seals the top end when valve assembly 46 is in the closed position. The bottom end of the transverse passage component 65, 65' is connected to a longitudinal passage component 66, 66'. The longitudinal passage component 66, 66' extends generally in the longitudinal direction of the gun body 38.

As shown in FIGS. 5 and 6, the longitudinal passage component 66, 66' includes a ball check assembly generally indicated at 68 therein. The ball check assembly 68 can be of any type well known in the industry. As shown, the ball check assembly 68 primarily includes a ball 70 connected to a pin 72. The pin 72 is operatively connected to a spring 74. A ball seat 76 is also operatively associated with the spring 74. In operation, the ball 70 is normally biased by the spring 74 against the ball seat 76 such that fluid cannot flow past. As fluid is introduced through the fluid passage 62, 62' fluid flows through the longitudinal passage component 66, 66' and forces the ball 70 out of engagement with the ball seat 76 to allow reactant fluid flow toward the mixing chamber, as will be described below. The ball check assembly 68 prevents the flow of fluid in the opposite direction, by the action of the ball 70 with the ball seat 76. A suitable seal 78, such as an O-ring seal may be disposed between the ball seat 76 and mix head 82 adjacent the ball seat 70.

The longitudinal passage component 66, 66' of the fluid inlet passage is connected to a mixing chamber fluid inlet 80, 80'. That is, the longitudinal passage component 66, 66' and the mixing chamber fluid inlet 80, 80' are in fluid communication. The mixing chamber fluid inlet 80 is downstream of the ball check assembly 68.

The mixing chamber fluid inlet 80, 80' preferably extends generally transverse to the longitudinal component 66, 66' of the fluid inlet. A cap 81 closes the mixing chamber fluid inlet 80, 80' in one direction to prevent fluid flow outward of the gun 12. In the embodiments shown, the mixing chamber fluid inlet 80, 80' tapers from a generally wider top portion connected to the longitudinal passage component 66, to a generally narrower bottom portion that is connected to the mixing chamber at an orifice or fluid inlet opening.

A mix head 82 is connected to the forward portion of the gun body 38. The mix head 82 is secured to the gun body 38 with suitable fasteners, such as cap screws 84 (FIG. 2). The mixing chamber fluid inlet 80, 80' is contained within the mix head 82.

The mix head 82 contains a sleeve receptacle in the form of a longitudinal bore 86 extending through the mix head 82. The longitudinal bore 86 houses a sleeve 88, 88'. The sleeve 88 is maintained in the bore 86 by including an outer annular flange 89. The outer annular flange 89 engages the mix head 82 to prevent axial movement of the sleeve 88, 88' outwardly of the gun 12.

The sleeve 88, 88' also has a longitudinal bore therethrough, which defines the mixing chamber 90. The mixing chamber fluid inlet 80, 80' also passes through the wall of the sleeve 88, 88' in a direction generally transverse to the longitudinal axis of the sleeve 88, 88'. The mixing chamber fluid inlet 80, 80' is thus in fluid communication with the mixing chamber 90 to allow reactant fluid to enter the mixing chamber 90.

The mixing chamber 90 includes an outer end 91 through which the reacted fluid exits the gun 12. Thus, reactant fluid enters the mixing chamber 90 through the inlets 80, 80' and the mixed reacted fluid exits the mixing chamber 90 through the outer end 91.

As shown in FIG. 5, the fluid passage 62 and mixing chamber fluid inlets 80 have generally the same diameter for each of the fluid inlet openings. This works well when standard reactants are used as described above, having comparable ratios of the volumes of the inlet fluids needed for the reaction, and comparable viscosities of the reactant fluids.

As shown in FIG. 6, the fluid passages 62' may have different diameters. Furthermore, the diameters of the respective mixing chamber fluid inlets 80' and fluid inlet openings may be different. This becomes important when the ratio of the volume of the reactant materials varies and/or the viscosity of one of the reactant materials is substantially different than the viscosity of the other reactant material, such as, for example, when using the no or low isocyanate reactant as described above. The mixing chamber fluid inlets 80' are machined to sizes that will provide respective desired fluid pressures for a given viscosity and flow rate. In addition, as shown in FIG. 6, the portion of the mixing chamber fluid inlet 80' passing through the sleeve 88' to the fluid inlet opening, may be slightly angled. This allows the reactant fluid to be more evenly dispersed over the reactant fluid stream entering from the opposite side of the mixing chamber 90. In this manner, better mixing of the reactant fluid stems is achieved to achieve a more complete reaction.

In addition, as shown in both FIGS. 5 & 6, two inlet passages 62, 62' are shown. It will be appreciated that any number of inlet passages 62, 62' may be used within the scope of the present invention depending on the number of reactant streams necessary for a proper reaction. It is preferred, however, that the forward edges of the mixing chamber fluid inlets 80, 80' be aligned in the direction of the longitudinal axis of the sleeve 88. This is important because when mixing commences, as will be described below, each mixing chamber fluid inlet 80, 80' preferably is exposed at the same time for proper reaction of the components.

The gun 12 further includes a valve needle 92. The valve needle 92 is disposed for reciprocating movement within the mixing chamber 90. The valve needle 92 is removably connected to the connecting rod 28 at the end of the connecting rod opposite that connected to the piston 22.

In the embodiments shown, the removable connection between the connecting rod 28 and valve needle 92 is as follows. The end of the connecting rod 28 includes an annular flange 29. Similarly, the valve needle 92 includes an annular flange 94 at one end. A coupler generally indicated at 96 has two halves 98, 100. The coupler assembly 96 surrounds each of the annular flanges 29, 94. When the two halves 98, 100 are placed around the flanges 29, 94 a retainer sleeve 101 is placed about the coupler 96 to secure the halves 98, 100 together. The retainer sleeve 101 comprises cylindrical tubing. A pair of O-rings 102 then snap into grooves (in the outer surface of the halves 98, 100) to hold the sleeve 101 and prevent sliding movement of the sleeve 101 relative to the halves 98, 100. As shown in FIG. 5, each of the halves 98, 100 includes a leg 103 at each end to engage the respective flanges 29, 94. With the coupler 96 secured in this manner, the valve needle 92 is secured to the connecting rod 28.

To disconnect the valve needle 92 from the connecting rod 28, the user must simply remove each of the O-rings 102 from each of the halves 98, 100. The sleeve 101 is then removed from the halves 98, 100. The halves 98, 100 can then be separated and the valve needle 92 can be removed from the connecting rod 28. A quick connect/disconnect coupler 96 of the type shown in the Figures allows the valve needle 92 to easily be removed from the mixing chamber 90 to allow cleaning of the mixing chamber 90, or similar service on the gun. While one type of coupler 96 has been shown, it will be appreciated that any type of coupler that allows for relatively quick connection/disconnection between the valve needle 92 and connecting rod 28 falls within the scope of the present invention.

The coupler 96 can be engaged/disengaged with no more tools than one small screwdriver. The coupler 96 allows for axial and radial misalignment between the valve needle 92 and the hydraulic cylinder connecting rod 28. The coupler 96 can be engaged/disengaged with the gun stuck in either the open or closed position.

The sleeve 88 extends outwardly of the mix head 82 in the forward direction. The sleeve 88 has an outer surface that includes male threaded position forward of the mix head 82. A lock collar 104 is disposed about the end of the sleeve 88 that protrudes from the mix head 82. The lock collar 104 has a female threaded position that engages the male threaded portion of the sleeve 88. Thus, the lock collar 104 is threaded onto the male threaded position to thereby secure the lock collar 104 with the sleeve 88 and prevent axial movement of the sleeve 88 through the mix head 82 in the direction toward the gun body 38. Thus, the sleeve 88 is prevented from axial movement outward of the gun 12 by the annular flange 89 engaging the mix head 82, and is prevented from axial movement inward of the gun 12 by the threaded connection between the sleeve 88 and the lock collar 104.

In the embodiment of FIG. 5, the sleeve 88 and the mix head 82 are accurately machined to provide a very close fit between the respective parts. Both the exterior wall of the sleeve 88 and interior wall of the mix head 82 are generally cylindrical. It is important that the sleeve 88 and mix head 82 are in very close proximity. That is, the dimensional tolerance between the sleeve 88 and mix head 82 is very small, as is known in the art. If the space between the sleeve 88 and mix head 82 is too great, the reactant fluids may seep about the periphery of the sleeve 88 and react in the longitudinal bore 86 and outside of the mixing chamber 90. Of course, this is undesirable. The components using the standard reactants defined above allow for the sleeve 88 and mix head 82 to be machined to a close fit without the need to further seal the mixing chamber fluid inlet 80 at the connection of the sleeve 88 and mix head 82. Notwithstanding the close fit that prevents fluid flow about the exterior of the sleeve 88, suitable seals 108, such as O-ring seals may be placed between the sleeve 88 and mix head 82 forward and rearward of the mixing chamber fluid inlet 80.

Similarly, the valve needle 92 and interior surface of the sleeve 88 are accurately machined to provide a very close fit between the respective parts. Both the valve needle 92 and interior surface of the sleeve 88 are cylindrical. It is important that the valve needle 92 and the interior surface of the sleeve are in very close proximity. This is because the valve needle 92 serves two important functions. First, when the needle 92 is in a forward closed position (shown in FIG. 6) it covers the mixing chamber fluid inlets 80,80' so as to act as a valve and prevent the flow of the reactant fluids into the mixing chamber 90. As the valve needle 92 moves to the rearward or open position (As shown in FIG. 5), the valve needle 92 moves past the mixing chamber fluid inlets 80, 80', exposing them to the mixing chamber 90 at the same time.

After the desired amount of reacted material has exited the mixing chamber 90, the valve needle 92 moves from the open to the closed position. The second important function of the valve needle 92 takes place during this movement. Specifically, the valve needle 92 acts to clean the mixing chamber 90 of residual reactant and reacted fluids by scraping the wall of the mixing chamber 90. This movement causes the remaining fluid in the mixing chamber 90 to be purged from the mixing chamber 90. When the valve needle 92 is in the closed position, the end of the valve needle 92 is preferably even with the opening at the outer end 91 of the mixing chamber 90, or the valve needle 92 extends slightly forwardly of the outer end 91 and out of the mixing chamber 90. This aids in purging any reacted or remaining reactant fluids from the mixing chamber 90.

As shown in FIG. 6, the valve needle 92 may also include a groove 110 to aid in scraping the wall of the mixing chamber 90. The groove 110 scrapes the build up (sometimes referred to as varnishes) from the bore of the sleeve that defines the mixing chamber 90. The groove 110 scrapes the bore as the valve needle 92 moves in both directions (that is while opening and closing the gun). Another function of the groove 110 is to minimize the contact area between the valve needle 92 and the sleeve wall. In this manner, the groove 110 also helps break the metal-to-metal bond that tends to form between the valve needle 92 and sleeve wall that can seize the gun.

In the preferred embodiment, the groove 110 is helical. A second helical groove (as shown in FIG. 6) may also be incorporated which is circumfrentially offset from the first helical groove. The helical grooves 110 should be oriented such that the groove 110 can not simultaneously expose the mixing chamber fluid inlets 80, 80'. That is, the two helical grooves cannot connect the mixing chamber fluid inlets 80, 80' to the same groove 110. As shown in FIG. 6, each different helix is connected to the different inlets 80, 80'. If only a single helix is used, its pitch must be such that it does not connect the inlets 80, 80'.

The valve needle 92 may also include a pair of annular grooves 112. The annular grooves are disposed such that one of the annular grooves 112 is positioned forward of the mixing chamber fluid inlets 80, 80' when the valve needle 92 is in the forward closed position. The second of the annular grooves 112 is positioned rearward of the mixing chamber fluid inlets 80 when the valve needle 92 is in the forward closed position. The annular grooves 112 serve to prevent reactant fluids from passing thereby. That is, any residual reactant fluid will collect in the annular groove 12 and react, thus creating a seal at that point between the valve needle 92 and the interior wall of the mixing chamber 90.

Figure 7:
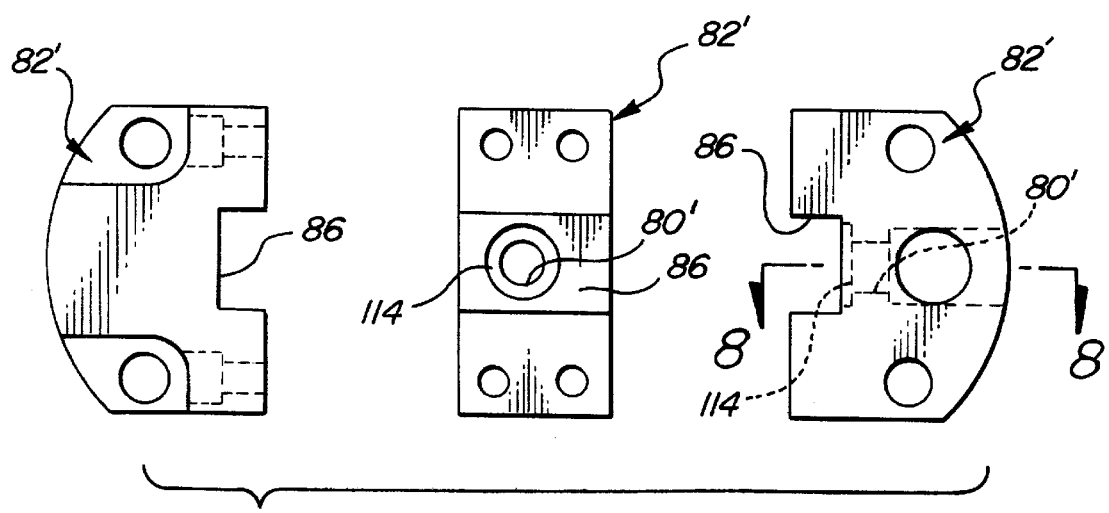
FIG. 7 includes front, side and back elevational views of one half of the mix head of the embodiment of FIG. 6.
Figure 8:
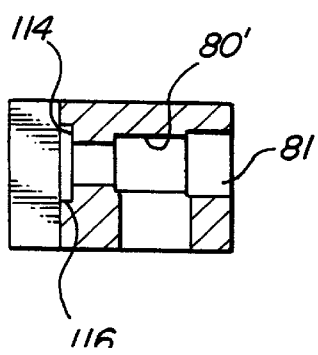
FIG. 8 is a cross-sectional view taken along lines 8—8 of FIG. 7.

In the alternate embodiment of the sleeve 88', as shown in FIGS. 6 & 7, and mix head 82', as shown in FIG. 6, the exterior wall of the sleeve 88' is generally rectangular at the area where it engages the sleeve receptacle of the mix head 82'. Similarly, the interior surface 86' defining the sleeve receptacle of the mix head 82' is rectangular to mate, in close proximity with, the exterior wall of the sleeve 88'. The mix head 82' includes at least one recess 114 in a flat sidewall of the sleeve receptacle 86'. The recess 114 surrounds the mixing chamber fluid inlet 80'. Alternatively, the recess 114 could be placed in the exterior wall of the sleeve 88'.

It is preferred that, a recess 114 surrounds each mixing chamber fluid inlet 80. A suitable seal 116, such as an O-ring seal is disposed in the recess 114 and is compressed between the sleeve 88' and the sleeve receptacle 86' of the mix head 82'. The O-ring 116 prevents the reactant fluid from passing between the sleeve 88' and the sleeve receptacle 86' of the mix head 82'. This sealing arrangement is particularly effective when one or more of the reactant fluids are not relatively viscous, and could seep through the press fit arrangement of the previous embodiment of FIG. 4 as discussed above. Furthermore, when the sleeve 88' having a generally rectangular configuration is used, it is preferred to make the mix head 82' in two halves, one of which is shown in FIG. 7. The halves are split in the longitudinal direction along the top and bottom surfaces. It is preferred that the split not be located on the sides including the recesses 114. Furthermore, while the sleeve 88' is preferably rectangular, it may have other configurations. It has been found, however, that a relatively flat interface between the sleeve receptacle 86' of mix head 82' and the sleeve 88', and the incorporation of a recess 114 to receive an O-ring 116, provides a suitable sealing arrangement.

The gun body 38 further includes at least one heating element 118. The heating element 118 is positioned in the gun body 38 in proximity to the fluid passage 62, 62' to maintain the reactant fluids at an elevated temperature necessary for proper reaction. The heating element 118 heats the gun body 38 sufficiently to allow the first shot of reacted material to be useful. In the preferred embodiment, two heating elements 118 are used. One heater 118 is placed next to each of the inlet passages 62, 62'. The use of two heaters 118 results in properly balanced heating of the gun 12.

The heating element 118 heats the gun body 38 to a temperature to maintain the reactant fluids at a suitable reaction temperature. As described below, the reactant fluids are typically preheated to a suitable reaction temperature before being transmitted to the application gun 12. Typically, at start-up, the gun body 38 is not at a suitable temperature for the foaming reaction to occur. In prior art assemblies, the heat energy contained in the reactant fluid streams, and the heat energy given off by the foaming reaction is used to heat the gun body and maintain it at a suitable reaction temperature. This is undesirable because the first shots of the reactant fluid existing the mixing chamber 90 are not useable. The heating element 118 is used to preheat the gun body 38 so that heat energy is not dissipated from the reactant fluid streams, thus maintaining the reactant fluid at a suitable reaction temperature so that the first shot emanating from the mixing chamber 90 is useable. The temperature of the gun body is monitored by a temperature sensor 119 (FIG. 1). The temperature sensor comprises a thermocouple feedback system that uses a heating control washer thermocouple 119. The sensors 119 could also be RTD'S. The sensors 119 provide a temperature feedback signal to the electronic controller 128 so that it can accurately control the gun temperature by controlling the power sent to the heating elements 118 in the gun 12.

In the preferred embodiment, a pair of heating elements 118 is used. Each heating element 118 is preferably an electric cartridge heater. There are many other ways of heating the gun body 38. For example, the heating element 118 may comprise coring inside the gun body 38 through which a heated liquid such as a water/glycol mixture is run.

The gun body 38 also includes a pair of proximity switches 120, 122 (FIG. 4) located on the bottom side thereof. The proximity switches 120, 122 may be mounted on a bracket 124. The proximity switches 120, 122 detect the two positions of the gun 12. The two switches 120, 122 are a gun closed switch 120 and a gun open switch 122. The gun closed switch 120 detects when the gun 12 is closed and the gun closed switch 120 is on. The open switch 122 detects when the gun 12 is open and the open switch 122 is on.

The electronic controller 128 controls the entire dispensing system. The proper sequencing of the gun 12 is as follows.

When the electronic controller 128 receives a dispense signal (either in manual mode by the trigger handle 14 or push button, or in automatic mode via robot or automation control signal) and providing a shot type has been selected in the electronic controller 128 and providing the system 10 is ready to dispense (not refilling, at pressure at temperature, not faulted, etc.) the controller 128 begins the sequence. First, the controller 128 energizes a directional valve to send hydraulic fluid to the gun 12 to open it. As the gun 12 opens, the gun closed proximity switch 120 signal goes from "on" to "off." When the signal goes off, the controller 128 causes the metering unit 130 to advance a predetermined amount (volume) at a predetermined rate (flow rate). When the gun open 122 proximity switch goes on, the controller 128 stops energizing the open gun directional valve which in turns stops hydraulic fluid flow to the gun 12 to stop the opening motion of the gun 12. When the controller 128 has sensed (via a position feedback transducer) that the metering unit 130 has displaced the proper volume of reactants for the shot requested, the controller 128 energizes the closed gun solenoid directional valve (A three position, double solenoid valve) and causes the metering unit 130 to stop. When the gun-closed proximity switch 120 goes on, the controller 128 stops energizing the closed gun directional valve which in turn stops hydraulic fluid flow to the gun 12 trying to close it. The controller 128 then reports the success (or lack of) of the shot dispensed and whether or not it is ready for the next shot.

The gun 12 of the apparatus 10 has been described in detail above. The apparatus 10 also includes a reactant fluid delivery system or dispenser generally indicated at 126 in FIG. 9. The reactant fluid dispenser 126 includes the electronic controller 128, and hydraulic power unit 140 as will be hereinafter described. The reactant fluid dispenser 126 also includes a metering unit 130 and a reactant fluid heater generally indicated at 134.

Preferably, the metering unit 130 is a fixed ratio positive displacement metering unit with constant flow rate control. (FIG. 9) The positive displacement metering unit 130 can be a single-acting piston displacement (lance type) metering assembly with positive shut-off (power) flow valves 150 on both the inlet 152 and outlet 154 of the meter assembly 130 with a driver 156. (FIG. 9a) The driver 156 could include a heavy-duty hydraulic cylinder 158 or an electric servomotor with a ball screw actuator.

Alternatively, the metering unit 130 could include a precision tool steel gear pump with driver. The driver could be a hydraulic motor or an electric drive servomotor with gear reducer.

The constant flow rate of the metering unit 130 can be achieved in a number of ways. For example, a constant flow rate of the metering unit 130 can be achieved by using a hydraulic cylinder/motor. A pressure compensated flow control or proportional flow control valve 160 with hydrostat 162 is used to control the speed of the driver 156. (FIG. 9a) By doing so, the load on the driver 156 (from the meter assembly 130) can vary because of pressure or viscosity changes of the fluid, but the driver 156 will hold speed because of the pressure compensated flow of the hydraulic fluid to the driver 156. Thus, the flow of reactant fluid from the metering unit 130 is constant. Alternatively, the constant flow rate of the metering unit 130 can be achieved by using an electric drive servomotor with ball screw actuator or servomotor with a gear reducer. An amplifier that powers the servomotor is configured for velocity mode. By doing this, the servo drive will hold speed against a variable load because of the feedback circuit between the servomotor and its amplifier.

Another method for achieving constant flow rate is to use any of the driver configurations listed above, but a position and velocity loop is closed between a servo control in the controller 128 and a position feedback transducer 164 in the metering unit. The position feedback transducer 164 may include a linear encoder when used for lance meters or may include a rotary encoder when used for gear pumps.

A schematic diagram for a reactant fluid dispenser 126 including a two component fixed ratio positive displacement constant flow metering unit 130 is shown in FIG. 9a as used on conventional foam production dispenser systems. The ratio of reactant fluid flow rates is fixed but is changeable by changing one or both of the meter assembly 130 pistons/rod diameters and packings. A position transducer 164 (in this example) is used for position control only.

Figure 9:
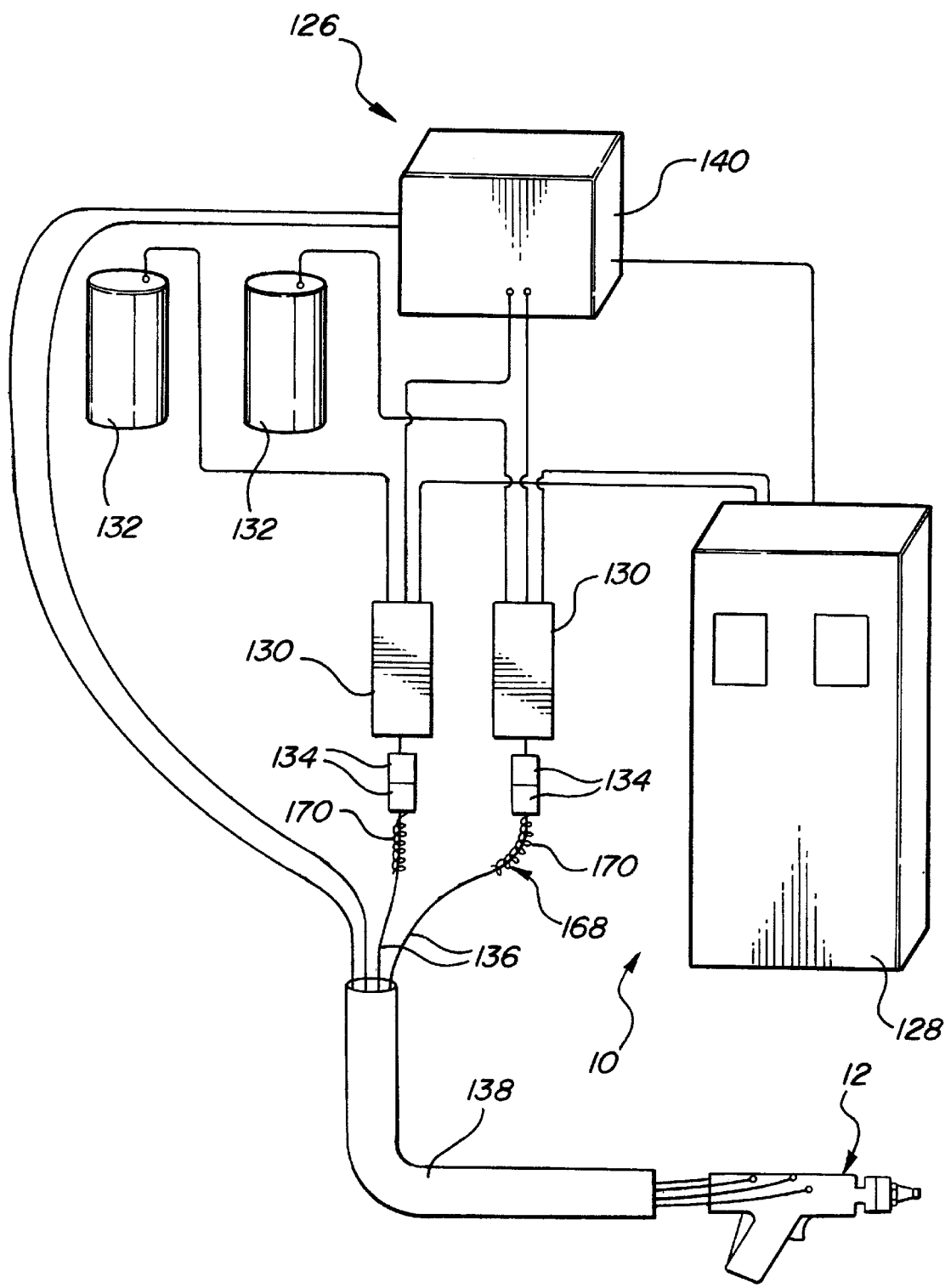
FIG. 9 is a schematic view of the entire apparatus for applying a foamable material.
Figure 9B:
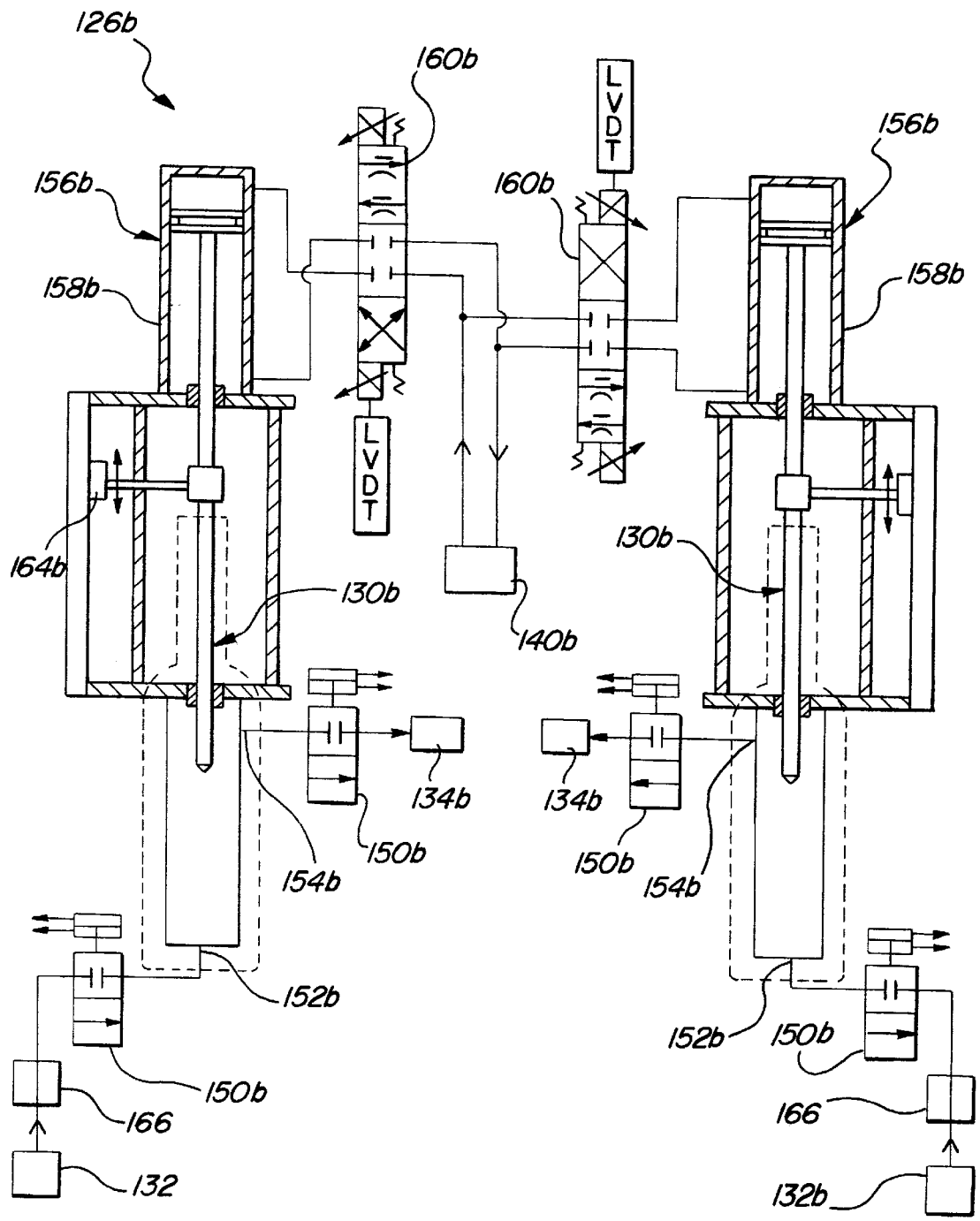
FIG. 9b is a schematic view of an alternate reactant fluid delivery system according to the present invention.

FIG. 9b shows a two component, adjustable ratio, positive displacement constant flow rate dispenser 126b as used for the alternate reactants with no or low isocyanates. (Elements of dispenser 126b shown in FIGS. 9b and 10 that are the same or analogous to elements shown in FIGS. 9 and/or 9a bear the same reference numeral only with the suffix "b".) The adjustable ratio dispenser system 126b allows adjustability of the reactant fluid flow rate ratio by changing the rates of one of the metering units 130b versus the rate of the other 130b. A position transducer 164b in the form of a linear encoder is used with a servo control for more precise position and velocity control. The meter assemblies 130b are heated and controlled since fluid heaters (preheaters) 134b are included upstream of the inlets 152b of the meter assemblies 130b (as described below). This dispenser 126b thus meters heated fluid, which is more accurate than heating the fluid after it is metered.

The metering unit 130, in the preferred embodiment, is a single acting unit. That is, the metering unit delivers reactant fluid in only one direction of the stroke of the unit. The metering unit 130 also preferably uses a heavy-duty hydraulic cylinder drive 156. The metering unit 130 is in fluid communication with and draws reactant fluid from supply tanks 132. The reactant fluid supply tanks 132 contain the reactant fluids used in the system.

Filling of the metering units 130 never occurs while the gun 12 is open. At startup, when commanded to, or whenever the controller 128 determines that there is insufficient reactant material resident in the meters 130 to deliver a shot (via a position transducer) and the system is not dispensing, the controller 128 causes the metering units 130 to refill. This sequence is as follows. The outlet valves on a metering unit 130 are held closed. Inlet valves are opened. A proportional directional valve is controlled to cause the hydraulic cylinder to retract. The retracting cylinder draws the meter rods upwardly and out of the meter assemblies. While refilling, the controller 128 monitors pressure in both meters to insure that the supply of reactant fluid can keep up. If pressure in either meter falls below a minimum set point, the refill halts and waits for the supply pressure to rebuild before resuming the refill cycle. This is to prevent cavitating meters. If the refill is halted for too long, the controller 128 declares a refill fault and sends the appropriate signal. Once the hydraulic cylinder is fully retracted, the refill cycle ends and the proportional directional flow control valve is centered and the inlet valve closed.

Once the refill cycle ends, the recharge cycle begins. This cycle is as follows. The inlet and outlet valves on the meters are held closed. The proportional directional flow control valve is controlled to cause the hydraulic cylinder to advance at a slow rate. While the cylinder is advancing, the controller 128 monitors hydraulic pressure at the driving end of the hydraulic cylinder. The controller 128 also monitors meter pressures to insure that both sides are primed with reactant fluid and that one or the other meter does not over-pressurize. When the hydraulic pressure (at the cylinder) is equal to or greater than a minimum set point (a recharge pressure) the recharge cycle ends. When the recharge cycle ends, the proportional directional flow control valve is centered and on the preferred embodiment, outlet valves are opened. If all other aspects of the system are satisfactory, the controller 128 issues the appropriate ready to dispense signal.

In the preferred embodiment as shown in FIG. 9a, to achieve the fixed ratio displacement of the reactant fluid, one hydraulic cylinder 158 drives both metering unit pistons at the same time. A single hydraulic drive unit 156 is connected to each of the pistons in the metering unit 130 to dispense the reactant fluid.

Alternatively, as shown in the FIG. 9b embodiment, each of the metering units 130b is shown connected to its own hydraulic cylinder 158b. Each cylinder 158b uses a separate high performance proportional directional flow control valve 160b. That is, two separate drives 156b are shown for driving the respective metering unit pistons that deliver the respective reactant fluids. This system is utilized for the alternate reactants with no or low isocyanates.

Fluid heaters 134 are preferably located at the outlet end of the metering units 130. As shown in the FIG. 9a embodiment, each of the metering units 130 is connected to two fluid heaters 134 in series. The first fluid heater 134 of each pair is a preheater and generally set at a lower temperature setting than the post (second) heater 134. The preheater 134 feeds partially heated reactant fluid to the post heater 134. The post heater 134 is more accurately controlled by the controller 128 using thermocouple feedback including a thermocouple that is disposed in the reactant fluid itself to monitor the temperature of the fluid and not the temperature of the heater block. A reactant fluid hose 136 is connected to the outlet of each fluid post-heater 134. The other end of each reactant fluid hose 136 is connected to one of the inlet passages 64 on the applicator gun 12. Although, in the preferred embodiment, two metering units 130 are provided as are two pairs of fluid heaters 134, other embodiments may include only a single metering unit connected to a single pair of fluid heaters or a single fluid heater. It will be appreciated that any number of metering units 130, fluid heaters 134 and hoses 136 may be utilized within the scope of the present invention.

Figure 10:
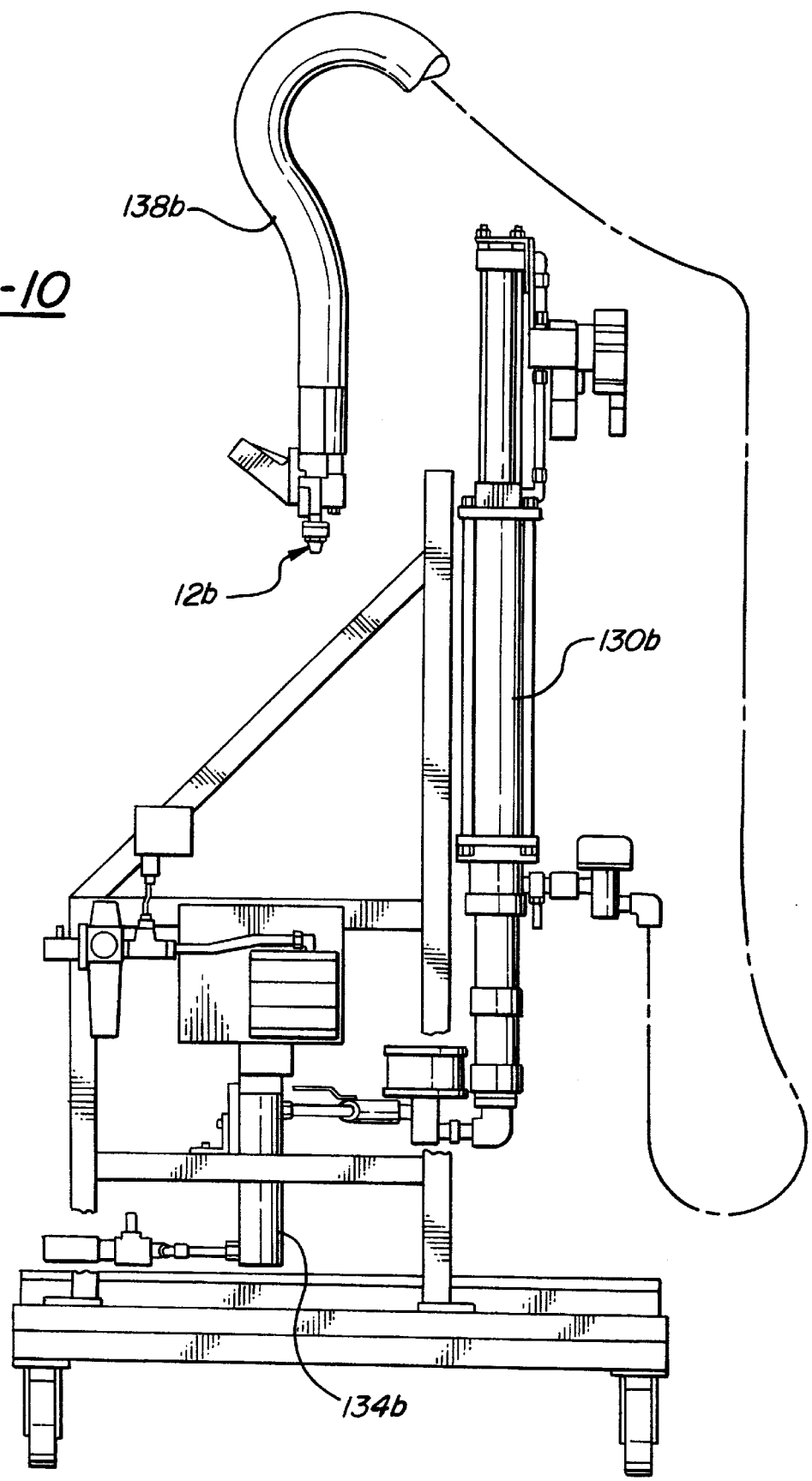
FIG. 10 is a side elevational view of the reactant fluid delivery system of FIG. 9b.

An alternative heating arrangement is shown in FIGS. 9b and 10. According to the embodiment of FIGS. 9b and 10, fluid heaters 134b are located upstream of the respective metering units 130b. (In other embodiments the metering units 130 themselves may be heated.) It will be appreciated that fluid heaters 134 can be either upstream of the respective metering units 130, on the metering units themselves, or on the outlet sides of the metering units 130.

Each of the hoses shown at 136 in FIG. 9 includes a heating assembly 168. Each hose preferably is wound with a heating element 170 to maintain the reactant fluid at its elevated temperature. The heating assembly 168 also includes a thermocouple feedback to the electronic controller 128. Each of the heated hoses 136 is then wound together inside a bundler 138. Preferably, the heating elements 170 on each of the hoses 136 are electric. All of the electric elements 170 around the hoses 136, the hydraulic lines necessary for operation of the gun, and the electrical wiring between the gun and the electronic controller are similarly wrapped in the bundler 138.

It will be appreciated, however, while the hoses 136 are preferably heated by electronic heating elements, other methods of heating the hoses 136 are within the scope of the present invention. For example, fluid lines can be placed around the hoses and a heated water/glycol system can be circulated through the system to maintain the hoses 136 at their elevated temperature. The bundler 138 is insulated to inhibit the loss of heat from the hoses 136.

As stated above, the electrical control panel generally controls the temperature, pressure and volume (by controlling displacement of the fluid meter or the turning of a precision gear pump) and flow rate. The volume of the reactant fluid can be controlled independently of the flow rate which is controlled by the rate of advance of the piston within the metering unit or, alternatively, by the speed of a precision gear pump, depending upon which dispensing system is utilized. The control panel 128 is preferably a programmable logic controller that is used to monitor and send signals to adjust the temperature, pressure, volume and flow rate of the reactant fluids (as described above). The electrical control panel 128 is used to monitor the temperature of the gun heating element 118. The electric control panel 128 monitors separate signals from PID temperature controllers to adjust the temperature. The electrical control panel 128 also controls the opening and closing of the gun 12.

The hydraulic power unit 140 is in fluid communication with both of the metering units 130 and the gun 12 through the use of suitable hydraulic hoses and valving in any well-known manner. In the preferred embodiment, the hydraulic power unit comprises a double pump set up. First, a variable displacement piston pump is used for driving the metering unit 130 as set forth in detail above. A proportional directional valve controls the movement of the metering unit. A second pump, such as a vane pump or another variable displacement pump is also utilized to power and open and close the gun 12 via a directional solenoid valve as set forth in detail above. It is preferred that the hydraulic lines from the hydraulic power unit 140 to the gun 12 are also included within the heated bundler 138 as stated above.

In operation of the apparatus 10, the electrical control panel 128 is energized, as is the hydraulic power unit 140. The fluid heaters 134, heated bundler 138 and heating elements 118 of the gun 12 are also energized to preheat these devices. The temperature of each of these is controlled by the electrical control panel 128. Each of the fluid heaters 134, heated bundler 138 and heating elements are allowed to reach a suitable reaction temperature.

Once the devices are at a suitable reaction temperature, and the metering units contain enough reactant fluid to deliver a shot, the electronic controller 128 sends a signal to open the gun 12. As set forth above, as the valve needle is retracting, reactant fluids are delivered from the metering unit 130 to the gun 12. It will be appreciated that no reactant fluid flow begins until the gun is switched to the open position and the unit is driving toward the open position as set forth above. When the valve needle 92 reaches the fully retracted position, the gun open switch senses the position of the valve needle 92 and signals the controller 128 to send a signal to the hydraulic actuator to stop movement of the valve needle 92. An appropriate amount of reactant fluid is metered by the metering units 130. The reactant fluid exits the respective fluid heater into the reactant fluid hoses 136 and passes through the hoses 136 in the bundler 138. The hose 136 is maintained at a sufficient temperature to maintain the reactant fluid at the appropriate reaction temperature. The reactant fluid passes through the respective reactant fluid hose 136 to the respective inlet passage component 64'. The fluid then passes through the valve 54 into the fluid transverse passage 65, 65'. The reactant fluid passes through the transverse component 65, 65' and into the longitudinal component 66, 66' of the fluid passage 62. The fluid then passes through the ball check assembly 68 and through the mixing chamber fluid inlet 80, 80'. Each of the reactant fluids is delivered to the mixing chamber 90 fluid inlets 80, 80' as described above.

As the gun 12 moves to the open position and the valve needle 92 is drawn rearwardly under the actuation of the hydraulic cylinder assembly 16, the mixing chamber fluid inlets 80 are exposed to the mixing chamber 90. This allows the reactant fluid to enter the mixing chamber 90.

The gun body 38 has been preheated as set forth above and remains heated by the heating elements 118 to maintain the gun body 38 and thereby the reactant fluids at the appropriate reaction temperature. Thus, reactant fluid at the appropriate reaction temperature enters the mixing chamber 90 and is allowed to react therein. The reacted fluid exits the mixing chamber 90 at its outward end 91. Because the gun body 38 includes the heating element 118, the first shot of the gun 12 is useable. When a sufficient amount of reacted material has been dispensed from the gun 12 (a shot), the controller 128 sends a signal to extend the valve needle 92 into the mixing chamber 90 under the actuation of the hydraulic cylinder assembly 16, as set forth in detail above.

The valve needle 92, as it passes through the mixing chamber 90, pushes any remaining reacted fluid or reactant fluids out of the mixing chamber 90. The helical groove 110 aids in scraping the sidewalls of the mixing chamber 90 to purge the mixing chamber of any remaining fluids. Once the valve needle 92 reaches its forwardmost position, the gun closed proximity switch 120 senses the position of the valve needle 92 and sends a signal to the electronic controller 128 which, in turn, sends a signal to the hydraulic unit to stop forward movement of the needle 92.

The process can be repeated to deliver as many shots as are required for a particular application. Generally, the metering units are designed with enough capacity to dispense all the shots required for one job. The units will refill and recharge between jobs. If another shot is requested when the meter capacity is insufficient to displace it, the controller 128 causes the metering unit 130 to refill and recharge first before it responds to the request to dispense, as set forth above. This is one advantage of the gear pump type metering unit, that it never needs to refill.

The invention has been described in an illustrative manner, and is to be understood that the terminology that has been used is in the nature of description rather than of limitation. Obviously, many modifications and variations are possible in light of the above teachings. It is, therefore, to be understood that within the scope of the appended claims the invention may be practiced, otherwise as is specifically described.

We claim:

1. An apparatus for applying a multi-component foamable fluid plastic material, the material including at least two reactant fluids configured to form a foam when heated and mixed, the apparatus comprising:

an applicator gun including:

a support body structure, a mixing chamber supported in the support body structure and configured to receive two reactant fluids for mixing;

two mixing chamber fluid inlets disposed in the support body structure in fluid communication with the mixing chamber and configured to direct the respective reactant fluids into the mixing chamber through respective fluid inlet openings; and a reactant fluid dispenser connected to the applicator gun and configured to supply at least one of the reactant fluids to the applicator gun mixing chamber through at least one of the mixing chamber fluid inlets at a constant flow rate to continuously provide the first reactant fluid in proper proportion to a second one of the reactant fluids despite viscosity and/or density differences between the two fluids;

the cross-sectional areas of the fluid inlet openings being different, the cross sectional areas being measured perpendicular to the direction of reactant fluid flow through the fluid inlet openings.

2. An apparatus as defined in claim 1 in which a forward edge of each fluid inlet opening is aligned in the direction of a longitudinal axis of the mixing chamber to expose each fluid inlet opening at the same time for proper reaction of the components.

3. An apparatus for applying a multi-component foamable fluid plastic material, the material including at least two reactant fluids configured to form a foam when heated and mixed, the apparatus including:

a support body structure;

a mixing chamber supported in the support body structure and configured to receive pre-heated reactant fluids for mixing through two mixing chamber fluid inlet openings, the mixing chamber comprising an axial passage disposed generally transverse to the fluid inlet openings and configured to allow reactant fluids to exit the mixing chamber through an axial outer end of the axial passage;

two mixing chamber fluid inlets disposed in the support body structure in fluid communication with the mixing chamber and configured to direct the respective reactant fluids into the mixing chamber through the respective mixing chamber fluid inlet openings;

an elongated valve needle supported in the mixing chamber for reciprocal longitudinal movement between forward closed and a rearward open positions in the mixing chamber, the valve needle configured to expose the fluid inlet openings when retracted to the rearward open position to permit the reactant fluids to flow into the mixing chamber from the respective inlet openings and impingement mix therein, and to close off the fluid inlet openings and dispense the mixed fluids from the mixing chamber through the axial passage while being advanced to the forward closed position; and a heater disposed on the support body structure and configured to heat the support body structure;

the valve needle including a helical groove configured to purge the mixing chamber of unreacted and reacted fluids by scraping the interior surface of the mixing chamber.

4. An apparatus for applying a multi-component foamable fluid plastic material, the material including at least two reactant fluids configured to form a foam when heated and mixed, the apparatus including:

a support body structure;

a mixing chamber supported in the support body structure and configured to receive pre-heated reactant fluids for mixing through two mixing chamber fluid inlet openings, the mixing chamber comprising an axial passage disposed generally transverse to the fluid inlet openings and configured to allow reactant fluids to exit the mixing chamber through an axial outer end of the axial passage;

two mixing chamber fluid inlets disposed in the support body structure in fluid communication with the mixing chamber and configured to direct the respective reactant fluids into the mixing chamber through the respective mixing chamber fluid inlet openings;

an elongated valve needle supported in the mixing chamber for reciprocal longitudinal movement between forward closed and a rearward open positions in the mixing chamber, the valve needle configured to expose the fluid inlet openings when retracted to the rearward open position to permit the reactant fluids to flow into the mixing chamber from the respective inlet openings and impingement mix therein, and to close off the fluid inlet openings and dispense the mixed fluids from the mixing chamber through the axial passage while being advanced to the forward closed position; and a heater disposed on the support body structure and configured to heat the support body structure;

the valve needle including a pair of annular grooves disposed such that one of the annular grooves is positioned forward of the mixing chamber fluid inlet openings when the valve needle is in the closed position and the second of the annular grooves is positioned rearward of the mixing chamber fluid inlet openings when the valve needle is in the closed position; and the annular grooves are configured to prevent reactant fluids from passing the annular grooves by allowing any residual reactant fluid to collect in the annular grooves and react thus creating a seal between the valve needle and an interior wall of the mixing chamber.

5. An apparatus for applying a multi-component foamable fluid plastic material, the material including at least two reactant fluids configured to form a foam when heated and mixed, the apparatus including:

a support body structure;

a mixing chamber supported in the support body structure and configured to receive pre-heated reactant fluids for mixing through two mixing chamber fluid inlet openings, the mixing chamber comprising an axial passage disposed generally transverse to the fluid inlet openings and configured to allow reactant fluids to exit the mixing chamber through an axial outer end of the axial passage;

two mixing chamber fluid inlets disposed in the support body structure in fluid communication with the mixing chamber and configured to direct the respective reactant fluids into the mixing chamber through the respective mixing chamber fluid inlet openings; and an elongated valve needle supported in the mixing chamber for reciprocal longitudinal movement between forward closed and a rearward open positions in the mixing chamber, the valve needle configured to expose the fluid inlet openings when retracted to the rearward open position to permit the reactant fluids to flow into the mixing chamber from the respective inlet openings and impingement mix therein, and to close off the fluid inlet openings and dispense the mixed fluids from the mixing chamber through the axial passage while being advanced to the forward closed position, the valve needle including a helical groove configured to purge the mixing chamber of unreacted and reacted fluids by scraping the interior surface of the mixing chamber.

6. An apparatus for applying a multi-component foamable fluid plastic material, the material including at least two reactant fluids configured to form a foam when heated and mixed, the apparatus including:

a support body structure;

a mixing chamber supported in the support body structure and configured to receive pre-heated reactant fluids for mixing through two mixing chamber fluid inlet openings, the mixing chamber comprising an axial passage disposed generally transverse to the fluid inlet openings and configured to allow reactant fluids to exit the mixing chamber through an axial outer end of the axial passage;

two mixing chamber fluid inlets disposed in the support body structure in fluid communication with the mixing chamber and configured to direct the respective reactant fluids into the mixing chamber through the respective mixing chamber fluid inlet openings; and an elongated valve needle supported in the mixing chamber for reciprocal longitudinal movement between forward closed and a rearward open positions in the mixing chamber, the valve needle configured to expose the fluid inlet openings when retracted to the rearward open position to permit the reactant fluids to flow into the mixing chamber from the respective inlet openings and impingement mix therein, and to close off the fluid inlet openings and dispense the mixed fluids from the mixing chamber through the axial passage while being advanced to the forward closed position, the valve needle including a pair of annular grooves disposed such that one of the annular grooves is positioned forward of the mixing chamber fluid inlet openings when the valve needle is in the closed position and the second of the annular grooves is positioned rearward of the mixing chamber fluid inlet openings when the valve needle is in the closed position, the annular grooves being configured to prevent reactant fluids from passing the annular grooves by allowing any residual reactant fluid to collect in the annular grooves and react thus creating a seal between the valve needle and an interior wall of the mixing chamber.

* * * * *